United States Patent
Song et al.

(10) Patent No.: US 11,522,174 B2
(45) Date of Patent: *Dec. 6, 2022

(54) BATTERIES WITH ANODES OF CARBON-COATED MACRO-POROUS SILICON

(71) Applicant: Washington State University, Pullman, WA (US)

(72) Inventors: Min-Kyu Song, Pullman, WA (US); Younghwan Cha, Pullman, WA (US)

(73) Assignee: WASHINGTON STATE UNIVERSITY, Pullman, WA (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/022,843

(22) Filed: Sep. 16, 2020

(65) Prior Publication Data

US 2021/0104733 A1 Apr. 8, 2021

Related U.S. Application Data

(63) Continuation of application No. 16/572,988, filed on Sep. 17, 2019, now Pat. No. 10,797,308, which is a continuation of application No. PCT/US2018/049676, filed on Sep. 6, 2018.

(60) Provisional application No. 62/555,580, filed on Sep. 7, 2017.

(51) Int. Cl.
| | |
|---|---|
| *H01M 4/1395* | (2010.01) |
| *C01B 33/021* | (2006.01) |
| *C01B 33/06* | (2006.01) |
| *H01M 4/1393* | (2010.01) |
| *H01M 4/36* | (2006.01) |
| *H01M 4/38* | (2006.01) |

(Continued)

(52) U.S. Cl.
CPC ........ *H01M 4/1395* (2013.01); *C01B 33/021* (2013.01); *C01B 33/06* (2013.01); *H01M 4/1393* (2013.01); *H01M 4/366* (2013.01); *H01M 4/386* (2013.01); *H01M 4/625* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 10,767,308 B2 * | 9/2020 | Jansen | ............... D21C 11/0085 |
| 2018/0151874 A1 * | 5/2018 | Kim | ..................... H01M 4/366 |
| 2018/0179071 A1 * | 6/2018 | Cho | ........................ C01B 33/22 |

FOREIGN PATENT DOCUMENTS

CN 105826527 * 8/2016

OTHER PUBLICATIONS

Xiao, C et al. Large-scale synthesis of Si@C three-dimensional porous structures as high-performance anode materials for lithium-ion batteries. Journal of Materials Chemistry A, vol. 2, No. 48, 2014; pp. 5-15 (Year: 2014).*

* cited by examiner

*Primary Examiner* — Alix E Eggerding
(74) *Attorney, Agent, or Firm* — WCF IP

(57) ABSTRACT

Silicon materials suitable for use as an anode material and associated method of production are disclosed herein. In one embodiment, a silicon material includes crystalline silicon in a matrix and macro-scale pores distributed in the matrix of the crystalline silicon. The macro-scale pores can have a size greater than 100 nanometers, and surfaces of crystalline silicon in the macro-scale pores are coated with carbon.

12 Claims, 10 Drawing Sheets (51) Int. Cl.
*H01M 4/62* (2006.01)
*H01M 10/0525* (2010.01)

FIG. 6A  FIG. 6B  FIG. 6C $CO_2(g)$ Bulk Diffusion    Surface Diffusion    Inter-/Intra- Particular Diffusion

BATTERIES WITH ANODES OF CARBON-COATED MACRO-POROUS SILICON

CROSS-REFERENCE TO RELATED APPLICATION(S)

This application is a continuation of PCT/US2018/049676, filed Sep. 6, 2018, and claims priority to U.S. Provisional Application No. 62/555,580, filed on Sep. 7, 2017.

BACKGROUND

Lithium-ion batteries are a type of batteries in which lithium ions move from a negative electrode to a positive electrode during discharge and back when charging. Li-ion batteries can include an electrolyte in contact with an intercalated lithium compound as a cathode, and a carbon-based anode to form a battery cell. Lithium-ion batteries have high energy-to-weight ratios, low or no memory effects, and long charge-holding abilities when not in use. In addition to applications in consumer electronics, lithium-ion batteries are growing in popularity for defense, automotive, and aerospace applications. Such new applications impose a continued need to improve the energy density of lithium-ion batteries.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Certain lithium-ion batteries use carbon-based materials, such as graphite, as anodes. However, such carbon-based materials tend to limit charging capacities of lithium-ion batteries. For example, lithiation of a carbon-based anode can produce a charging capacity of about 372 mA·h/g, while lithiation of silicon (Si) can produce a charging capacity of about 4,200 mA·h/g. However, lithiation in silicon can involve about 300% volume change. Thus, after a few charge-discharge cycles, a bulk silicon-based anode would be pulverized. Silicon anodes can also form unstable solid-electrolyte interphase layers with electrolytes in lithium batteries. As such, the poor mechanical stability and chemical passivation properties of silicon can render silicon electrodes unsuitable for practical battery systems.

Several embodiments of the disclosed technology are directed to a battery system having an anode containing a carbon-coated macro-porous silicon material. The carbon-coated macro-porous silicon material can include particles individually containing crystalline silicon having macro-scale pores of greater than about 100 nm. Both internal and external surfaces of the crystalline silicon can be coated, at least partially, with carbon of an amorphous form, a semi-crystalline or crystalline form, or a mixture thereof. Experiments have shown that batteries having anodes constructed from examples of the carbon-coated macro-porous silicon material exhibit high electrical capacity and cyclability. Thus, the silicon material disclosed herein is suitable for battery applications.

In accordance with embodiments of the disclosed technology, the carbon-coated macro-porous silicon material can be prepared using a $CO_2$-thermic oxidation process (CO—OP). In certain implementations, the $CO_2$-thermic oxidation process can include an initial solid state reaction between silicon and a metal or metal mixture to form a metal silicide. Examples of a suitable metal can include magnesium (Mg), calcium (Ca), and barium (Ba). A solid state reaction using magnesium as an example can be as follows:

$$2Mg + Si \rightarrow Mg_2Si$$

In other examples, the solid state reaction can also use a mixture of at least two of the foregoing metals (e.g., both magnesium and calcium). Thus, the formed metal silicide can be a binary, ternary, quaternary, or other suitable orders of metallic system.

Upon completion of the solid state reaction, the $CO_2$-thermic oxidation process can include a thermal reaction in which the prepared metal silicide is oxidized using carbon dioxide ($CO_2$) to form particles of crystalline silicon coated with carbon and having multiple (e.g., hundreds) of nanometer-sized metal oxide structures in a single reaction. One example technique for performing the thermal reaction can include annealing or otherwise processing the metal silicide in a $CO_2$ environment at a suitable temperature (e.g., 700° C.). Under such conditions, the metal silicide (e.g., $Mg_2Si$) can react with $CO_2$ to form a metal oxide, silicon, and carbon in a single reaction, for example, as follows:

$$Mg_2Si + CO_2 \rightarrow Si + C + 2MgO$$

The $CO_2$-thermic oxidation process can then include an acid leaching operation to remove the metal oxide from the resultant composite of the thermal reaction to form a silicon matrix. The removed metal oxide can thus leave behind macro pores (e.g., several hundred nanometers in size) in the silicon matrix that are distributed randomly or in other suitable manners. As such, the metal oxide (e.g., MgO) can act as a sacrificial template for creating macro porous structures in the crystalline silicon. The resulting particles include carbon-coated macro-porous silicon and can be suitable for use as anodes in batteries. It is believed that the carbon coating can help to form protective solid-electrolyte interphase (SEI) and therefore resulting in good cycling performance. Thus, several embodiments of the $CO_2$-thermic oxidation process can yield the surface carbon coating and macro-porous structure of the silicon particles simultaneously. As such, separate carbon coating operations, such as time consuming chemical vapor deposition and carbonization of toxic organic precursors may be avoided.

Without being bound by theory, it is believed that by selecting or adjusting suitable combinations and/or relative compositions of the metal or metal mixture for forming the metal silicide, different macro- and/or micro-scale structures can be formed in the carbon-coated macro-porous silicon particles. For example, morphology of the carbon-coated macro-porous particles of silicon and carbon formed using calcium can be quite different from those formed using magnesium. In particular, experiments showed that using calcium can yield a unique layered two-dimensional silicon morphology in the resulting silicon particles. Thus, combining magnesium with calcium (or other suitable metals) with suitable relative compositions (e.g., molar ratios, percentages, etc.) can yield a unique morphology in the formed silicon particles.

In addition, the metal or metal mixture can also be in excess of silicon according to stoichiometry during the solid state reaction. It is also believed that by selecting or adjusting a level or percentage of excess of the metal or metal mixture, different macro- and/or micro-scale structures can be formed in the carbon-coated macro-porous silicon material. For instance, in the example solid state reaction above, magnesium may be 10%, 20%, 30%, 40%, or more in excess of silicon. The excess magnesium can react with $CO_2$ during the thermal reaction as follows:

$$2Mg + CO_2 \rightarrow C + 2MgO$$

The formed magnesium oxide (MgO) can then be removed during acid leaching to form macro-scale pores in the final particles. Thus, by adjusting a level of excess of magnesium, different numbers and/or formations of macro-scale pores can be obtained in the resulting silicon particles. Also, the formed carbon on the surface of the silicon can enhance overall electrical conductivity of the resulting silicon particles used for anodes of batteries which may be beneficial to cycling performance. In further implementations, the foregoing selection or adjustments of composition of the metal or metal mixture and corresponding level or percentage of excess may be applied in conjunction to yield a desired morphology in the resulting carbon-coated macro-porous silicon material.

BRIEF DESCRIPTION OF THE DRAWINGS

FIG. 7A shows lithiation and delithiation capacities of about 2732 mA·h/g and 2273 mA·h/g, respectively, which resulting in >83.2% coulombic efficiency. FIG. 7A also includes an inset showing dQ/dV plot for first cycling showing sharp peaks at ~0.05V, indicating phase transition of crystalline Si to amorphous Si.

FIG. 9A shows phase evolution of MgO and Si as well as the decrease of $Mg_2Si$ peak intensity starting at around 500° C.

DETAILED DESCRIPTION

Various embodiments of battery systems, devices, and associated methods of making are described herein. Even though the technology is described below using a lithium-ion battery as an example, in other embodiments, the technology may be applicable in other types of batteries (e.g., containing sodium, potassium, calcium, magnesium, cadmium, or copper ions), a chemical sensor, an organic thin film transistor, an electromechanical actuator, a gas separation membrane, a fuel cell, and/or other suitable electronic components. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1A-13.

Certain lithium-ion batteries use carbon-based materials, such as graphite, as anodes. However, such carbon-based materials tend to limit charging capacities of lithium-ion batteries. For example, lithiation of a carbon-based anode can produce a charging capacity of about 372 mA·h/g, while lithiation of silicon (Si) can produce a charging capacity of about 4,200 mA·h/g. However, lithiation in silicon can involve about 300% volume change. Thus, after a few charge-discharge cycles, a bulk silicon-based anode would be pulverized. Silicon anodes can also form unstable solid-electrolyte interphase layers with electrolytes in lithium batteries. As such, the poor mechanical stability and chemical passivation properties of silicon can render silicon electrodes unsuitable for practical battery systems.

Several embodiments of the disclosed technology are directed to a battery system having an anode containing a carbon-coated macro-porous silicon material. The carbon-coated macro-porous silicon material can include particles individually containing crystalline silicon having macro-scale pores of greater than about 100 nm. Both internal and external surfaces of the crystalline silicon can be coated, at least partially, with carbon of an amorphous form, a semi-crystalline or crystalline form, or a mixture thereof. Experiments have shown that batteries having anodes constructed from examples of such a carbon-coated macro-porous silicon material exhibit high electrical capacity and cyclability. In addition, examples of the silicon material can be produced using a $CO_2$-thermic oxidation process to form crystalline silicon and the coated carbon in a single reaction, as discussed in more detail below.

Figure 1A:
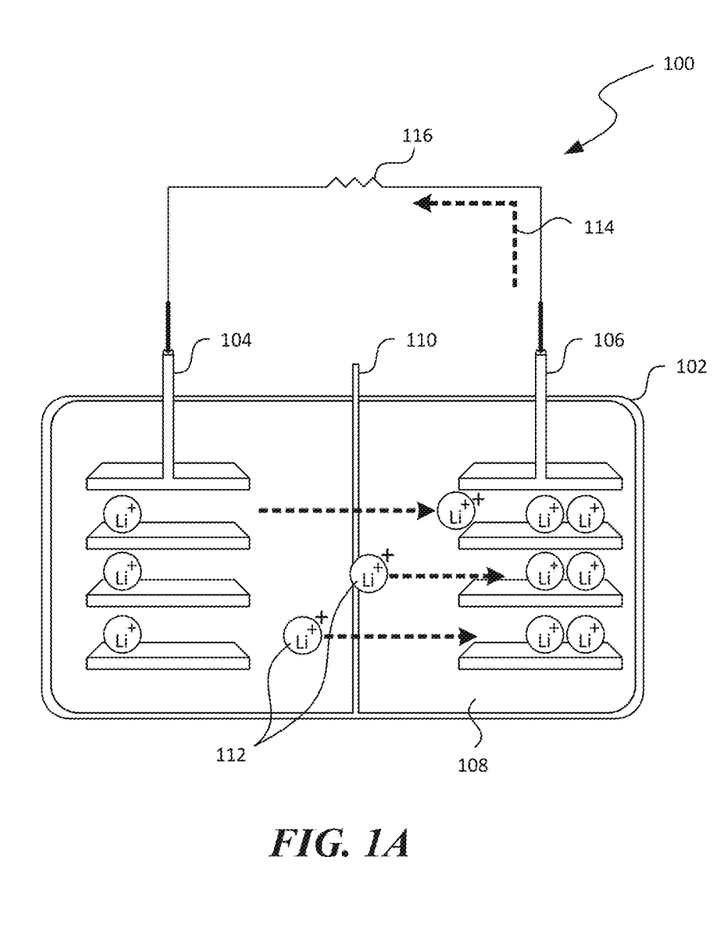
FIGS. 1A and 1B are schematic diagrams showing an example battery incorporating an anode having a carbon-coated macro-porous silicon material in accordance with embodiments of the disclosed technology.
Figure 1B:
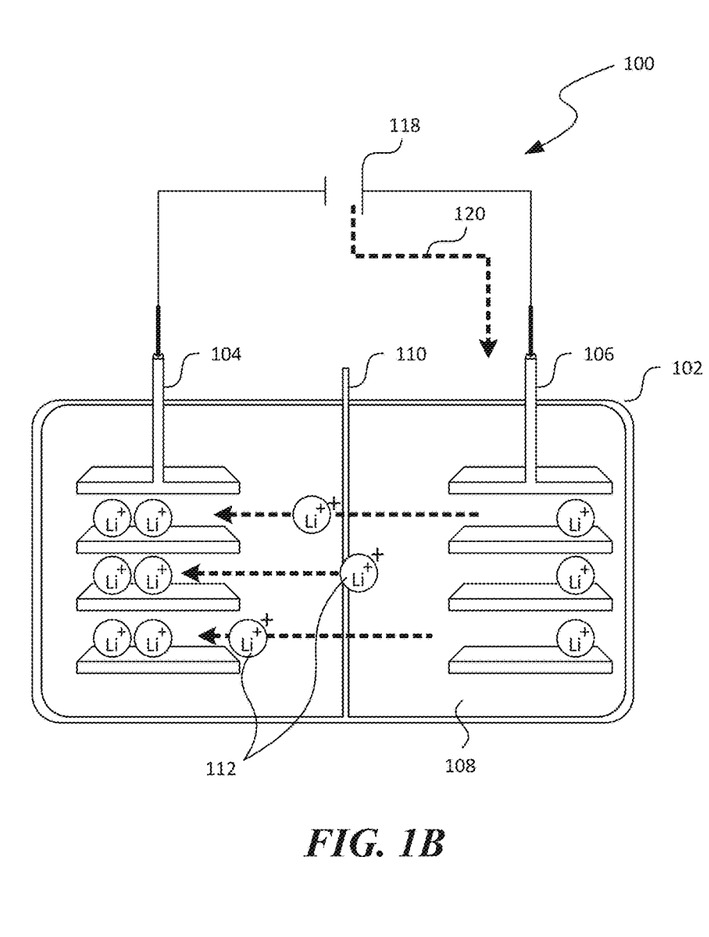

FIG. 1A is a schematic diagram of an example lithium-ion battery 100 during discharging, and FIG. 1B is a schematic diagram of the lithium-ion battery 100 during charging in accordance with embodiments of the technology. As shown in FIGS. 1A and 1B, the lithium-ion battery 100 can include a container 102 holding an anode 104, a cathode 106, an electrolyte 108, and an optional membrane 110 in the electrolyte 108. Even though only certain components are illustrated in FIGS. 1A and 1B, in other embodiments, the lithium-ion battery 100 can also include insulators, gaskets, vent holes, and/or other suitable components (not shown). In further embodiments, the membrane 110 may be omitted.

The cathode 106 can be constructed from a layered oxide (e.g., lithium cobalt oxide ($LiCoO_2$)), a polyanion (e.g., lithium iron phosphate ($LiFePO_4$)), or a spinel (e.g., lithium manganese oxide ($LiMn_2O_4$)). Other suitable materials for the cathode 106 can include lithium nickel oxide ($LiNiO_2$), lithium iron phosphate fluoride ($Li_2FePO_4F$), lithium cobalt nickel manganese oxide ($LiCo_{1/3}Ni_{1/3}Mn_{1/3}O_2$), $Li(Li_aN-i_xMn_yCo_z)O_2$, and/or other suitable cathode materials. Additional examples of metal compositions suitable for the cathode 106 can also include:

$LiNiCoAlO_2$ having 80% Nickel, 15% Cobalt, and 5% Aluminum $LiCoO_2$ having 100% Cobalt $LiMn_2O_4$ having 100% Manganese $LiNiMnCoO_2$ having 33.3% Nickel, 33.3% Manganese, and 33.3% Cobalt $LiFePO_4$ having 100% Iron In certain embodiments, the electrolyte 108 can include a non-aqueous solution of organic carbonates such as ethylene carbonate or diethyl carbonate containing complexes of lithium ions. The electrolyte 108 can contain non-coordinating anion salts such as $LiPF_6$, $LiAsF_6$, $LiClO_4$, $LiBF_4$, and lithium triflate. In other embodiments, the electrolyte 108 may also include an aqueous and/or a partially aqueous solution of lithium salts and/or other suitable compositions.

The anode 104 can be constructed, at least partially from a carbon-coated macro-porous silicon material. The carbon-coated macro-porous silicon material can include particles individually containing crystalline silicon having macro-scale pores of greater than about 100 nm distributed therein randomly or in other suitable manners. Both internal and external surfaces of the crystalline silicon can be coated, at least partially, with carbon of an amorphous form, a semi-crystalline or crystalline form, or a mixture thereof. Such a silicon material can be formed using a $CO_2$-thermic oxidation process described herein. The number and/or distribution of the macro-scale pores as well as morphology of the crystalline silicon can be controlled by adjusting one or more of a selection of metal silicide or a level of excess of metal for forming the metal silicide, as discussed in more detail below with reference to FIGS. 2-13.

As shown in FIG. 1A, during discharging, lithium ions 112 are extracted from the anode 104 and migrate toward the cathode 106 via the electrolyte 108. The lithium ions 112 pass through the optional membrane 110 and are inserted into the cathode 106. As a result, a current 114 flows from the cathode 106 past a load 116 to the anode 104. As shown in FIG. 1B, during charging, a charger 118 provides a charging current 120 to the cathode 106. The charging current 120 causes lithium ions 112 to be extracted from the cathode 106 and move toward the anode 104. The lithium ions 112 pass through the optional membrane 110 and are inserted into the anode 104 via, e.g., alloying and/or otherwise combining with the material of the anode 104.

Several embodiments of the lithium-ion battery 100 can have a higher charging capacity than conventional batteries using a carbon-based material for anode. For example, as discussed above, a conventional lithium-ion battery with a carbon-based anode can have a charging capacity of about 372 mA·h/g while several embodiments of the lithium-ion battery 100 can have a charging capacity of about 2,000 mA·h/g. As a result, the charging capacity of the lithium-ion battery 100 may be improved when compared to conventional lithium-ion batteries.

Several embodiments of the anode 104 of the lithium-ion battery 100 can have improved charging/discharging cyclability. Without being bound by theory, it is believed that several embodiments of the anode 104 can accommodate the large volume changes associated with lithium insertion because the macro pores in the crystalline silicon can contract and expand. For example, the macro pores may contract during lithium insertion and expand during lithium extraction without causing pulverization and/or other structural damage to the anode 104 as a whole. It is also believed that the carbon coating on the silicon material can also protect silicon from forming unstable solid-electrolyte interphase layers with electrolytes in a lithium battery. As such, chemical passivation properties of the silicon material can be improved to render the anode 104 stable for practical battery systems.

Figure 2:
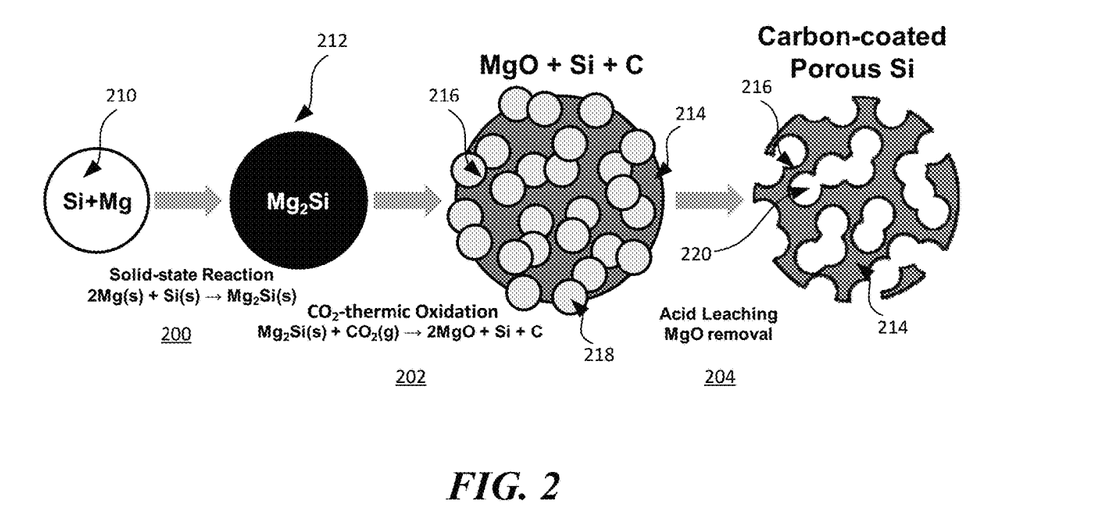
FIG. 2 is a schematic diagram illustrating an example $CO_2$-thermic oxidation process suitable for forming the carbon-coated macro-porous silicon material in FIGS. 1A and 1B.

FIG. 2 is a schematic diagram illustrating an example $CO_2$-thermic oxidation process suitable for forming the carbon-coated macro-porous silicon material in FIGS. 1A and 1B. In FIG. 2, magnesium silicide ($Mg_2Si$) was used to illustrate aspects of the disclosed technology. In other implementations, calcium (Ca), barium (Ba), or other suitable metals may also be used in addition to or in lieu of magnesium in the $CO_2$-thermic oxidation process.

An initial stage of the $CO_2$-thermic oxidation process can include a solid state reaction 200 between a metal and silicon. For example, as illustrated in FIG. 2, elemental magnesium (Mg) and silicon (Si) powders can be mixed to form a silicon/magnesium mixture 210. In certain embodiments, the magnesium and silicon can be in stoichiometric proportion of $Mg_2Si$. In other embodiments, the magnesium can be in excess of stoichiometric proportion of $Mg_2Si$ to ensure full conversion of Si to $Mg_2Si$. The solid state reaction 200 can then include heating the silicon/magnesium mixture at a reaction temperature (e.g., about 500° C.) for a period of time (e.g., about 10 hours) in an inert (e.g., argon) environment to obtain an intermetallic phase of $Mg_2Si$ 212, as follows:

$$2Mg+Si \rightarrow Mg_2Si$$

In other examples, the solid state reaction 200 also can include reacting other suitable materials to form intermetallic compounds, such as magnesium stannide ($Mg_2Sn$) and $Mg_2Cu$.

Subsequent to the solid state reaction 200, the $CO_2$-thermic oxidation process can also include a thermal reaction 202 at which the formed intermetallic compound is oxidized by carbon dioxide. For example, as shown in FIG. 2, the magnesium silicide can be oxidized by carbon dioxide as follows:

$$Mg_2Si+CO_2 \rightarrow 2MgO+Si+C$$

As shown above, products of the thermal reaction 202 can include a matrix of crystalline silicon 214 coated with carbon 216 and magnesium oxide (MgO) 218 dispersed in the crystalline silicon 214 randomly or in other suitable manners. The carbon 216 can be in an amorphous form, a semi-crystalline or crystalline form, or a mixture thereof. In embodiments in which the magnesium is excess of stoichiometric proportion of $Mg_2Si$, the excess magnesium can react with the carbon dioxide as follows to form additional magnesium oxide 218 and carbon:

$$2Mg+CO_2 \rightarrow 2MgO+C$$

Upon completion of the thermal reaction 202, the $CO_2$-thermic oxidation process can further include an acid leaching reaction 204 in which the metal oxide (e.g., MgO) is removed from the crystalline silicon 214 using hydrofluoric acid (HF), hydrochloric acid (HCl), or other suitable types of acid. Thus, as shown in FIG. 2, after the acid leaching reaction 206, the magnesium oxide is removed to form macro-scale pore 220 in the crystalline silicon 214. Both the interior and exterior surfaces of the crystalline silicon 214 can be covered with the carbon 216. As such, particles of crystalline silicon 214 can be efficiently formed with macro-scale pores and surface carbon 216 using the $CO_2$-thermic oxidation process. Changes in morphology of various products during stages of the $CO_2$-thermic oxidation process are discussed in more detail below with reference to FIGS. 3A-3D.

Figure 3A:
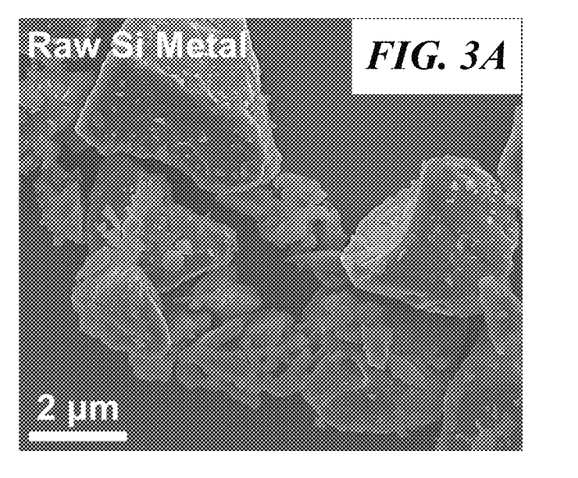
FIGS. 3A-3D are example scanning electron microscope (SEM) images of corresponding products from each stage of the $CO_2$-thermic oxidation process in accordance with embodiments of the disclosed technology.

FIGS. 3A-3D are example scanning electron microscope (SEM) images of example products from each stage of the $CO_2$-thermic oxidation process of FIG. 2 to illustrate change in morphology in accordance with embodiments of the disclosed technology. As shown in FIG. 3A, starting silicon powder exhibits smooth facets and average particle size of about 15 μm, which then drastically transforms into lumpy chunk (shown in FIG. 3B) after the thermal reaction 202 with magnesium powder. The transition from Si to $Mg_2Si$ may lead to an increase in particle size (e.g., about 20 μm). Based on the solid state reaction 200, approximately 160% of volume increase may occur during a phase transition from Si diamond cubic crystal structure with a lattice parameter of a=0.543 nm to $Mg_2Si$ antifluorite structure with a lattice parameter of a=0.634 nm.

Figure 3B:
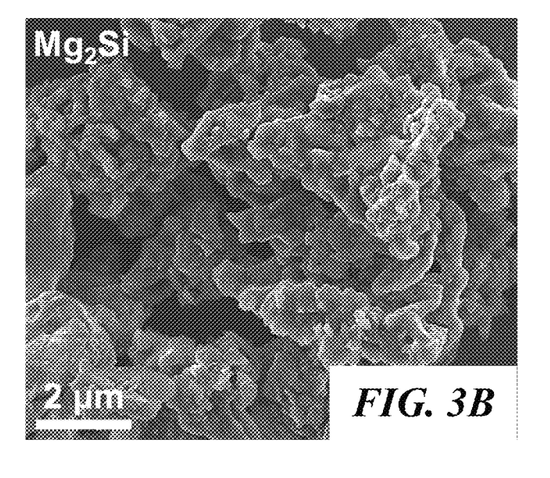

It is believed that magnesium is a main diffusive species during the solid-state reaction 200 with silicon. In general, the substance with a lower melting point has a relatively weaker atomic bonding and higher molar volume, which allows faster diffusion than the one with a higher melting point. In the illustrated example, the melting points of Mg and Si are 650° C. and 1414° C., respectively. Thus, Mg may easily diffuse into the innermost Si matrix, and hence enables the complete transformation to the intermetallic phase of $Mg_2Si$. Subsequently, during the thermal reaction 202, thermal oxidation of $Mg_2Si$ occurs and lead to a composite of magnesium oxide 218, crystalline silicon 214, and carbon 216.

Figure 3C:
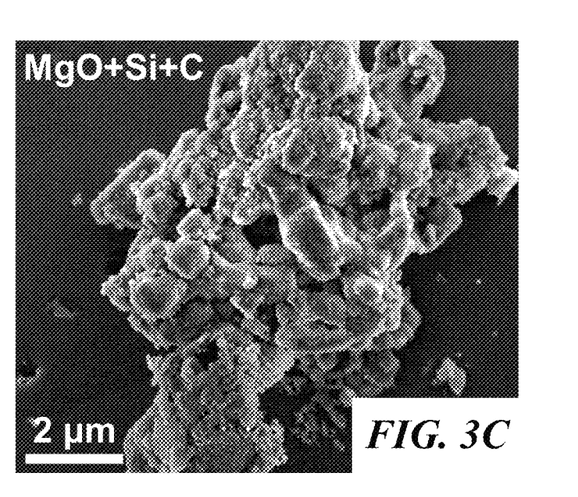
Figure 3D:
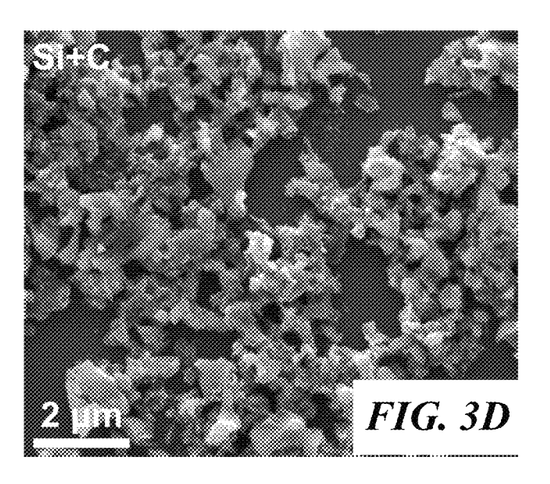

As shown in FIG. 3C, the morphology of the composite after the thermal reaction 202 was an irregular-shaped lump with numerous speckles on the surface. During the acid leaching reaction 204, acid leaching was performed to furnish the porous structure by removing magnesium oxide 218, shown in FIG. 3D. The removed oxides, such as MgO and possibly $SiO_x$, acted as sacrificial template for creating the macro-porous structure in the crystalline silicon 214. The macro-scale pores are believed to be desirable for Si-based anode materials and can contribute to a higher tap density. Tap density is typically measured by mechanically tapping a container until little further volume change is observed. Tap density is believed to be closely related to size and porosity of a tested material. In certain experiments, the carbon-coated macro-porous silicon material exhibited almost 3 times higher tap density than commercially available nanosized silicon powder.

Figure 4A:
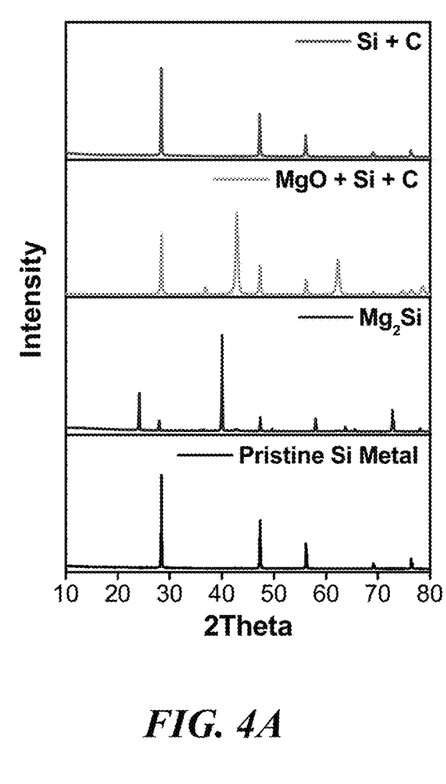
FIG. 4A shows analysis results of X-ray diffraction (XRD) of example products of a $CO_2$-thermic oxidation process in accordance with embodiments of the disclosed technology.
Figure 4B:
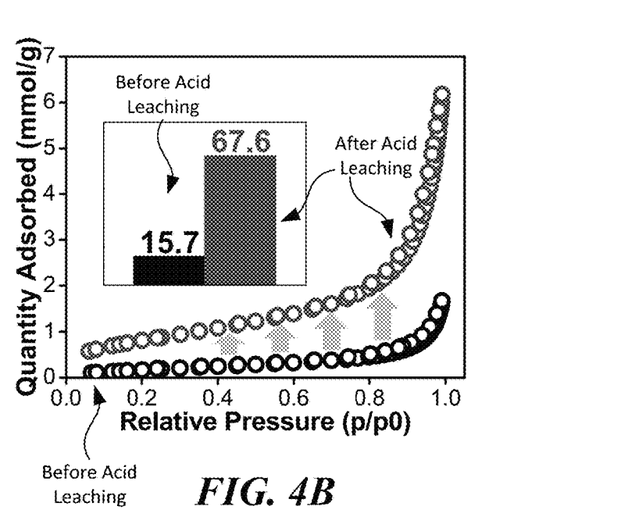
FIG. 4B shows analysis results of $N_2$ adsorption-desorption analysis of example products of the $CO_2$-thermic oxidation process in accordance with embodiments of the disclosed technology.
Figure 5A:
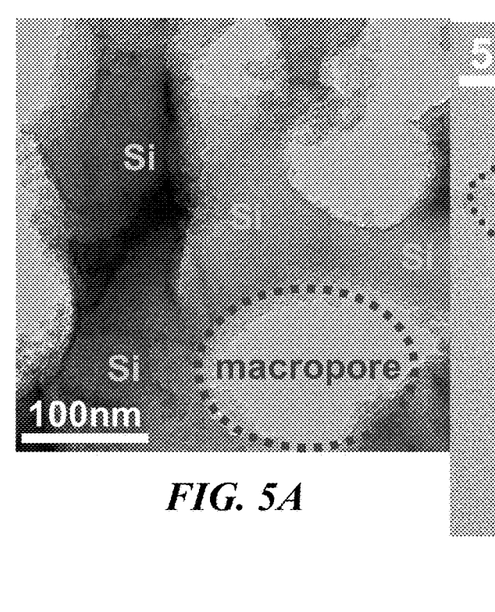
FIGS. 5A and 5B are example transmission electron microscopy (TEM) images of spherical macro pores and carbon layers on a silicon surface and carbon layer (dotted area) on silicon matrix of example products formed using the $CO_2$-thermic oxidation process in accordance with embodiments of the disclosed technology.
Figure 5B:
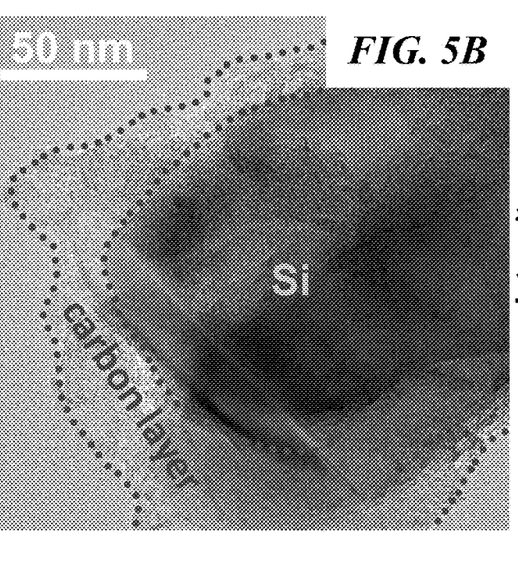

FIG. 4A shows analysis results of X-ray diffraction (XRD) of example products of a $CO_2$-thermic reaction in accordance with embodiments of the disclosed technology. The XRD analysis showed various stages of transition from silicon, to magnesium silicide, to a composite of magnesium oxide, silicon, and carbon, and finally to a silicon/carbon composite. $N_2$ adsorption-desorption analysis performed on the example silicon material showed that the BET surface areas of samples before and after acid leaching were 15.1, and 67.6 m²/g indicating the role of magnesium oxide 218 as a sacrificial template for creating the macro-porous structure and relatively low surface area compared to typical Nano-engineered Si-based anode materials. Furthermore, the SEM and TEM high magnification images in FIGS. 5A and 5B show that the Si/C composite after acid leaching exhibits porous structures with size greater than 100 nm and a generally uniform layer of carbon on the porous crystalline silicon.

Figure 5C:
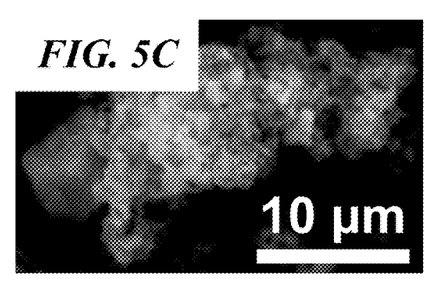
FIGS. 5C-5E are example energy-dispersive X-ray spectroscopy (EDS) elemental mapping results showing generally homogeneous distribution of carbon throughout a silicon particle formed using the $CO_2$-thermic oxidation process in accordance with embodiments of the disclosed technology.
Figure 5D:
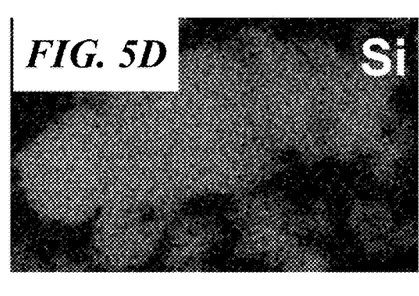
Figure 5E:
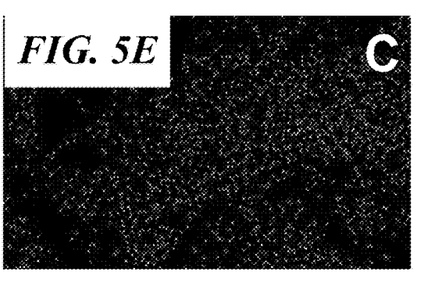
Figure 5F:
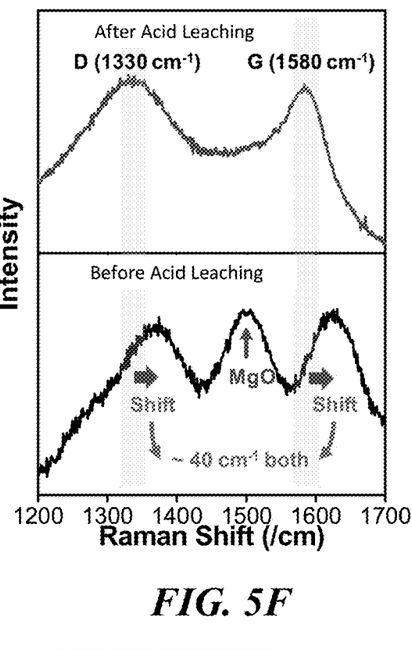
FIG. 5F shows an example Raman spectroscopy results before and after acid leaching showing that MgO is effectively removed and existence of carbon in a silicon particle formed using the $CO_2$-thermic oxidation process in accordance with embodiments of the disclosed technology.

To illustrate the formation of carbon 216 via the $CO_2$-thermic oxidation process with intermetallic compounds, EDS elemental mapping (shown in FIGS. 5C-5E) and Raman spectroscopy (shown in FIG. 5F) were performed. In the EDS result, generally uniform distribution of carbon throughout the particle were confirmed. Two peaks at around 1350/cm (D band) and 1580/cm (G band) in Raman analysis show the existence of carbon in the sample. The intensities in D and G bands are almost 1:1, which implies that the carbon synthesized through the $CO_2$-thermic oxidation process was a mixture of amorphous (or disordered) and graphitic carbon.

Figure 6A:
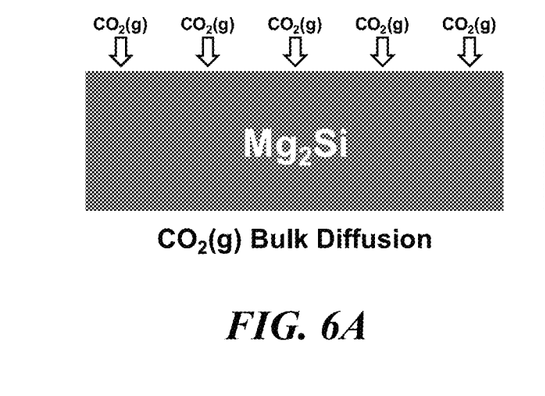
FIGS. 6A-6C are schematic diagrams showing example reaction kinetics between gaseous $CO_2$ and $Mg_2Si$ during initial bulk diffusion of gaseous $CO_2$, surface diffusion causing early formation of MgO/Si/C composite, and subsequent reaction between $Mg_2Si$ and diffused $CO_2$ in accordance with embodiments of the disclosed technology.
Figure 6B:
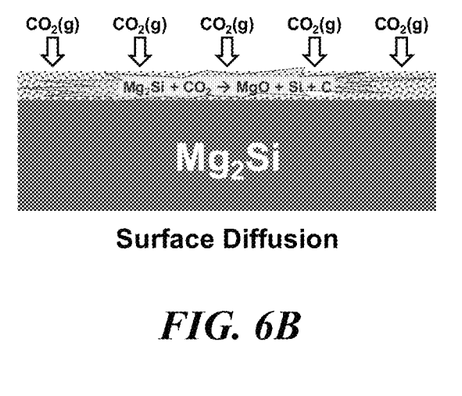
Figure 6C:
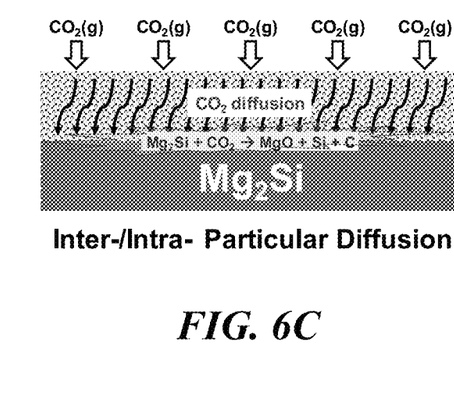

The reaction mechanism between gaseous $CO_2$ and $Mg_2Si$ may include three diffusion stages based on the behavior of gaseous $CO_2$ throughout the conversion, as shown in FIGS. 6A-6C. Initially, as shown in FIG. 6A, $CO_2$ molecules move towards the $Mg_2Si$ surface through the bulk gas layer. Then, as shown in FIG. 6B, surface diffusion of $CO_2$ molecules along the exterior of $Mg_2Si$ particles occurs, and the first oxidation reaction of $Mg_2Si$ occurs, which leads to the formation of the MgO+Si+C composite at the surface. After the formation of the first surficial MgO+Si+C composite layer, the consecutive supply of $CO_2$ gas molecules into the interior of the $Mg_2Si$ can be achieved through inter-/intra-particular diffusion of $CO_2$ molecules through the newly formed MgO+Si+C composite layer to continuously promote the oxidation reaction with internal $Mg_2Si$ until generally a full conversion is achieved.

Figure 7A:
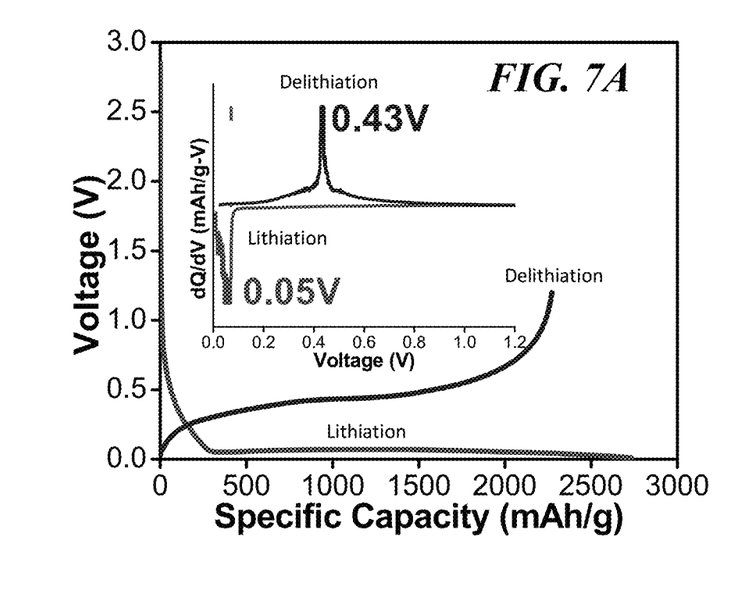
FIG. 7A shows an example first cycle voltage profile of a battery incorporating a carbon-coated macro-porous silicon material formed using the 002-thermic oxidation process in accordance with embodiments of the disclosed technology. In particular.
Figure 7B:
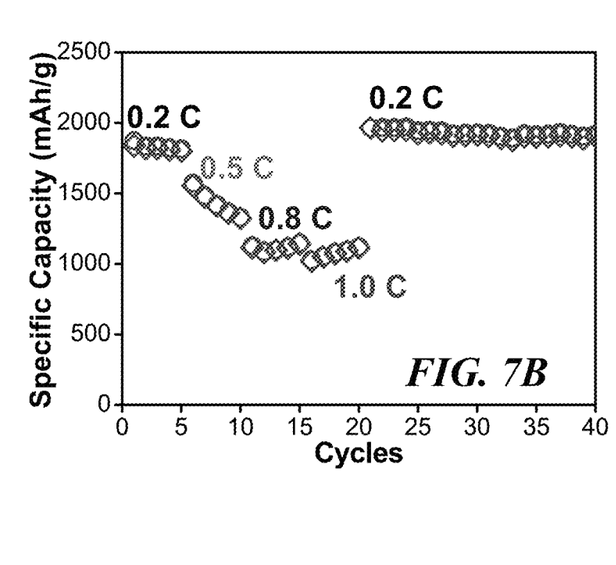
FIG. 7B shows an example rate capability result exhibiting ~1000 mA·h/g specific capacity at 1.0 C-rate and recovering back to ~2000 mA·h/g at 0.2 C-rate of a battery incorporating a carbon-coated macro-porous silicon material formed using the $CO_2$-thermic oxidation process in accordance with embodiments of the disclosed technology.
Figure 7C:
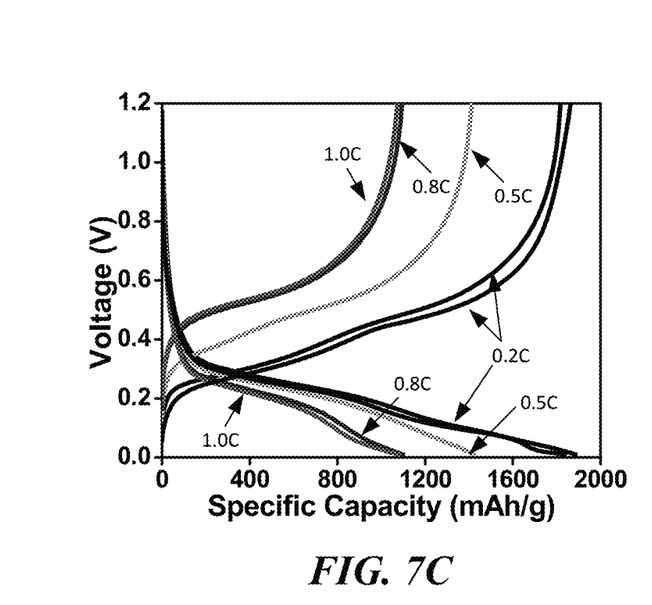
FIG. 7C shows example representative voltage profiles for C-rate of 0.2, 0.5, 0.8, and 1.0 of a battery incorporating a carbon-coated macro-porous silicon material formed using the $CO_2$-thermic oxidation process in accordance with embodiments of the disclosed technology.
Figure 7D:
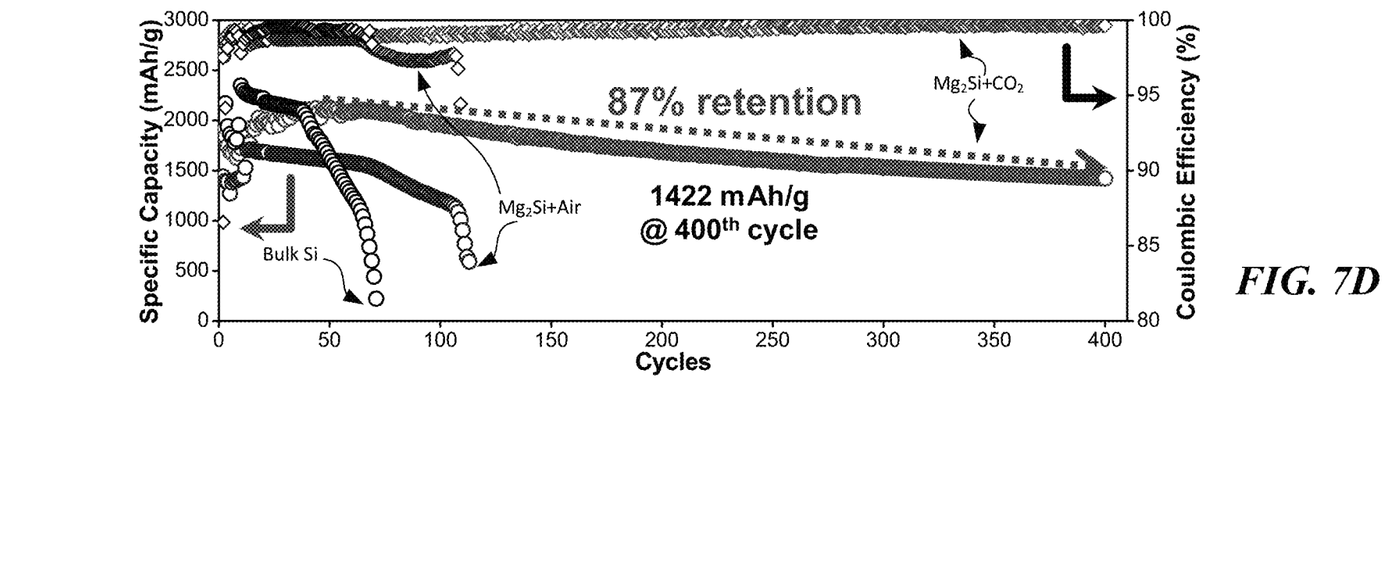
FIG. 7D shows a comparison of 0.2 C-rate cycling performance among example bulk silicon material, silicon via air-oxidation of $Mg_2Si$, and carbon-coated macro-porous silicon from the $CO_2$-thermic oxidation process in accordance with embodiments of the disclosed technology.
Figure 7E:
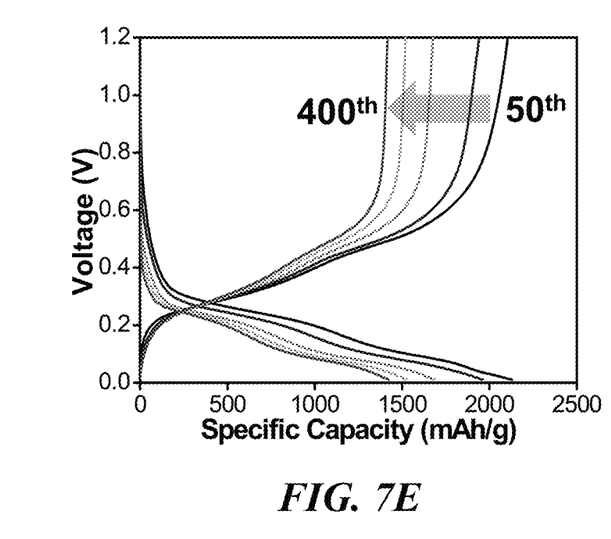
FIG. 7E shows example lithiation-delithiation profiles of carbon-coated macro-porous silicon material at different cycles in accordance with embodiments of the disclosed technology.
Figure 8A:
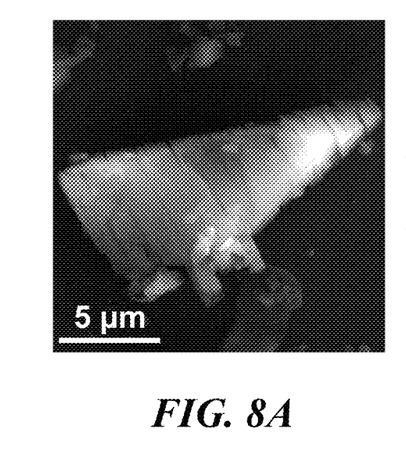
FIG. 8A shows an example SEM image of a layered silicon/carbon composite in accordance with embodiments of the disclosed technology.
Figure 8B:
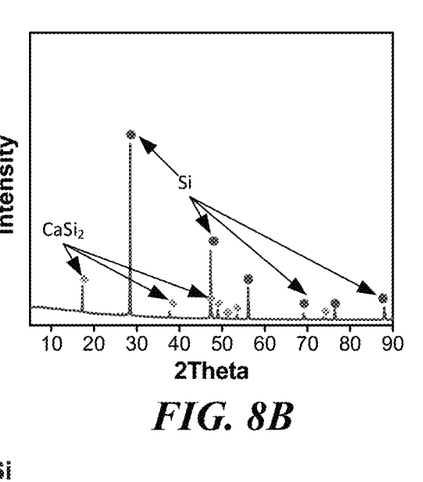
FIG. 8B shows an example result of an ex-situ XRD analysis showing that major phase is crystalline Si with approximately <10 wt % of $FeSi_2$ believed due to the existence of Fe in a starting material in accordance with embodiments of the disclosed technology.
Figure 8C:
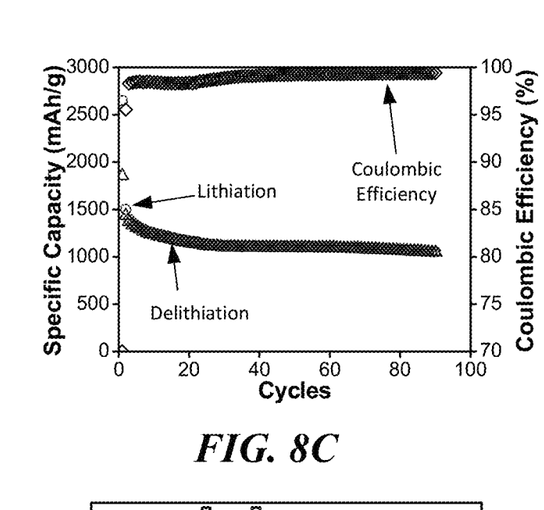
FIG. 8C shows an example cycling performance of a layered two-dimensional silicon/carbon composite at 0.5 C-rate in accordance with embodiments of the disclosed technology.

The electrochemical properties (e.g., cycling performance and rate capability) of example carbon-coated macro-porous silicon material produced during experiments were evaluated. As shown in FIG. 7A, initial lithiation and delithiation capacities of about 2732 mA·h/g and 2273 mA·h/g, respectively were observed. Such capacities correspond to about 83.2% initial coulombic efficiency. Furthermore, the carbon-coated macro-porous silicon material also showed a good rate capability (shown in FIG. 7B) of approximately 1000 mA·h/g at a 1.0 C rate, which recovered back to 2000 mA·h/g at 0.2 C rate. Representative lithiation/delithiation profiles at each C rate were shown in FIG. 7C, indicating phase transition of amorphous silicon during cycling. In FIGS. 7D and 7E, cycling performances at 0.2 C rate of the Si/C composite were compared with bulk Si and air-oxidized Si samples. Results showed good cycling stability of the example silicon material over 400 cycles exhibiting ~87% capacity retention and typical lithiation/delithiation phase transition during cycling.

Test with $CaSi_2$ via 002-thermic oxidation process were also conducted, as shown in FIGS. 8A-8C and 13. These results showed that $CaSi_2$ is also suitable for having a strong thermodynamic tendency to be oxidized with $CO_2$. The final morphology of the reaction product from $CaSi_2$ is different than the from $Mg_2Si$ possibly due to the unique crystal structure of $CaSi_2$ resulting in buckled layered two-dimensional silicon morphology. The Si/C composite with layered morphology via $CO_2$-thermic oxidation process with $CaSi_2$ exhibits stable cycling performance with about 1000 mA·h/g at 90th cycle (shown in FIG. 8C).

Figure 9A:
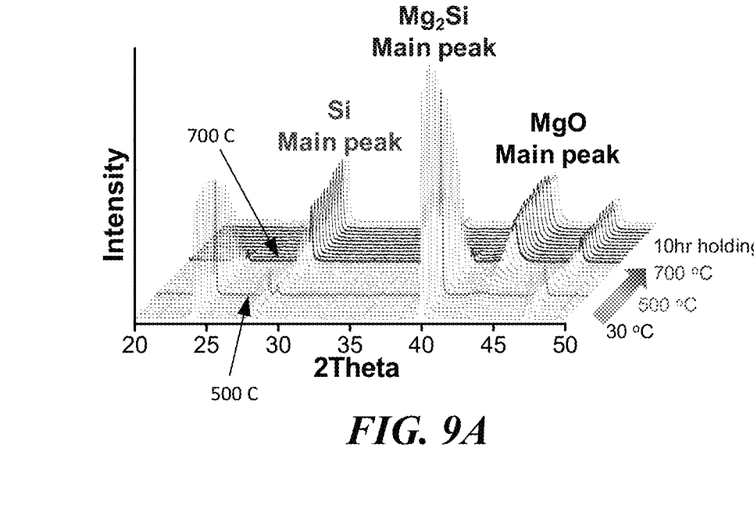
FIG. 9A shows an example in-situ high temperature XRD (HT-XRD) analysis of $Mg_2Si$ during the 002-thermic oxidation process. In particular.
Figure 9B:
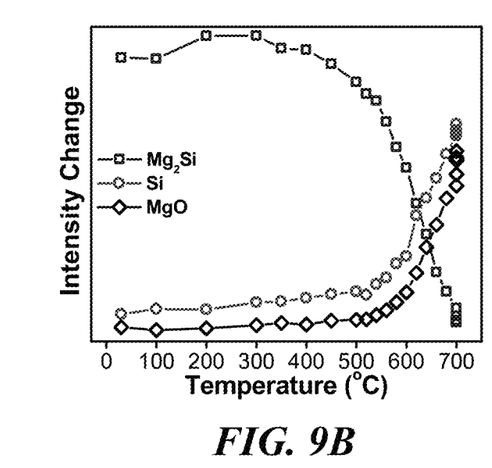
FIG. 9B shows an example peak Intensity change during in-situ HT-XRD showing clear phase evolution of Si and MgO in accordance with embodiments of the disclosed technology.
Figure 9C:
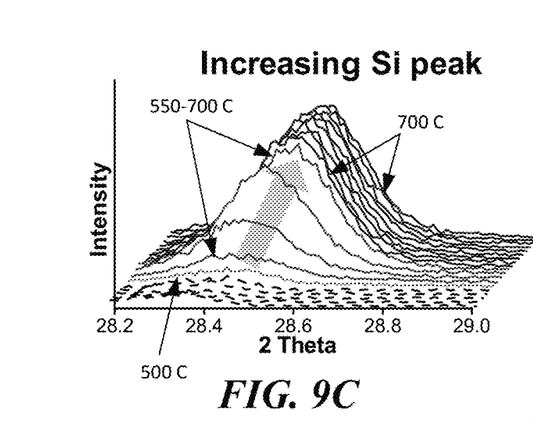
FIGS. 9C-9E show example magnified in-situ HT-XRD peaks at around 2θ=28~29°, 42~44°, and 39~40° where evident change in Si, MgO, and $Mg_2Si$ peak intensities, respectively, can be seen with respect to temperature changes.
Figure 9D:
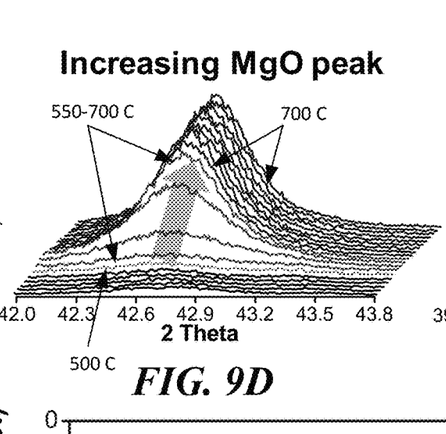
Figure 9E:
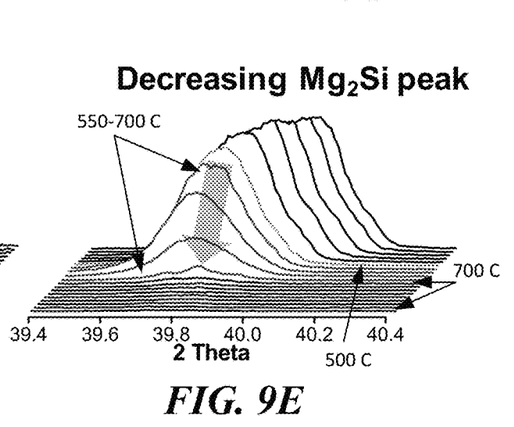

FIG. 9A shows an example in-situ high temperature XRD (HT-XRD) analysis of $Mg_2Si$ during the $CO_2$-thermic oxidation process. As shown in FIG. 9A, phase evolution of MgO and Si as well as decrease of $Mg_2Si$ peak intensity can be clearly seen starting at around 500° C. FIG. 9B shows an example peak intensity change during in-situ HT-XRD showing clear phase evolution of Si and MgO. FIGS. 9C-9E show example magnified in-situ HT-XRD peaks at around 2θ=28~29°, 42~44°, and 39~40° where evident change in Si, MgO, and $Mg_2Si$ peak intensities, respectively, can be seen with respect to temperature changes. As shown in FIGS. 9A-9E, phase evolution of MgO and Si as well as the decrease of $Mg_2Si$ peak intensity starting at around 500° C.

Figure 10:
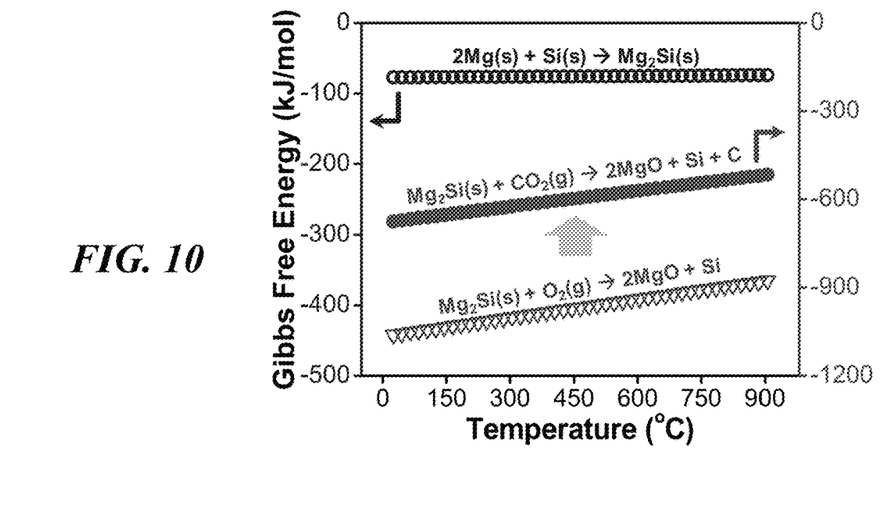
FIG. 10 shows example Gibbs free energies at various temperatures for $Mg_2Si$ formation and subsequent 002-thermic oxidation process of $Mg_2Si$ compared with Air (or $O_2$) oxidation in accordance with embodiments of the disclosed technology.

FIG. 10 shows example Gibbs free energies at various temperatures for $Mg_2Si$ formation and subsequent $CO_2$-thermic oxidation process of $Mg_2Si$ compared with Air (or $O_2$) oxidation in accordance with embodiments of the disclosed technology. As seen in FIG. 10, a thermodynamic driving force for this oxidation reaction is sufficient ($\Delta G$=−519 kJ/mol at 700° C.), a surficial conversion of magnesium to $Mg_2Si$ may proceed readily. In a $CO_2$ environment, the reaction is much milder exothermic than the one in air.

Figure 11A:
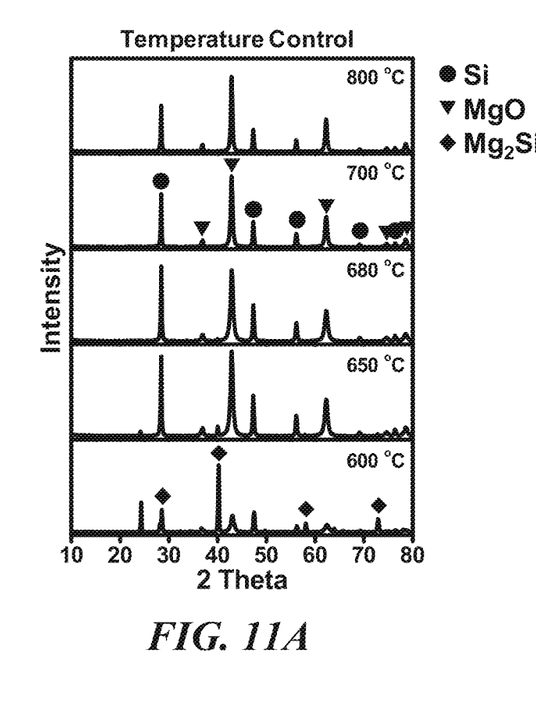
FIGS. 11A and 11B show example ex-situ XRD analysis to investigate the influence of temperature (600~800° C.) and holding time (50~600 minutes) on complete conversion of $Mg_2Si$, respectively.
Figure 11B:
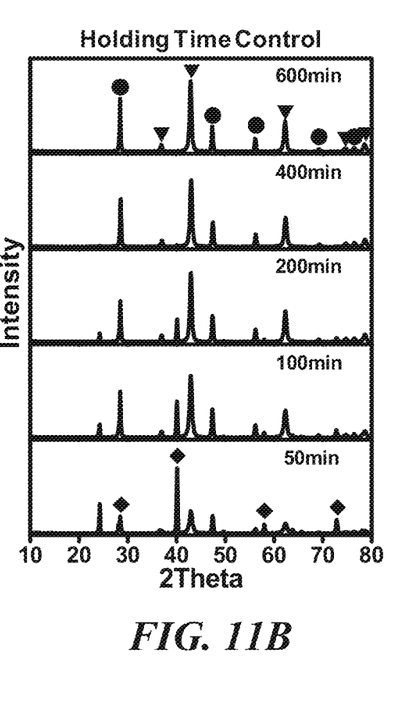
Figure 12A:
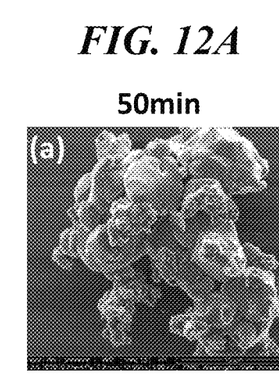
FIGS. 12A-12J show example SEM images of MgO+Si+C composite at 700° C. for various holding times of 50 min, 100 min, 200 min, 400 min, and 600 min. These figures show that overall particle size does not change much but the morphology is significantly altered by the holding time from 50 min to 400 min.
Figure 12B:
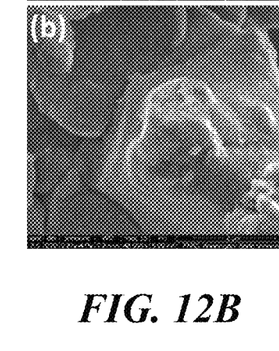
Figure 12C:
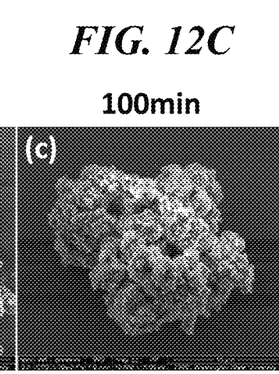
Figure 12D:
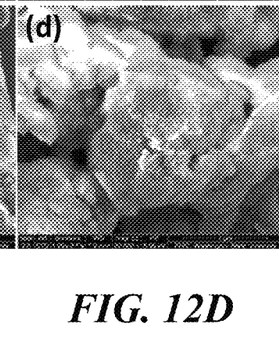
Figure 12E:
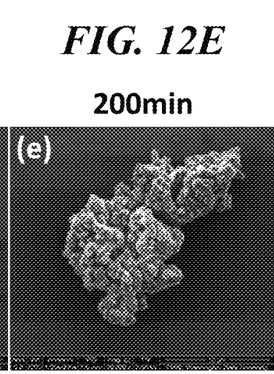
Figure 12F:
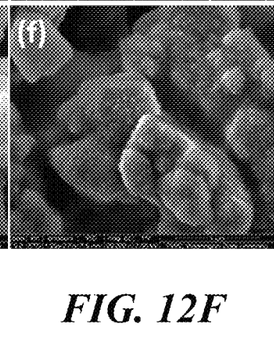
Figure 12G:
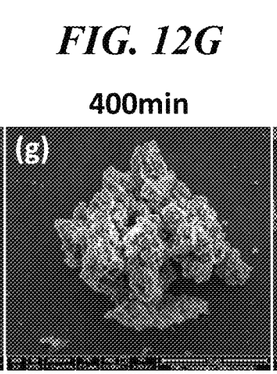
Figure 12H:
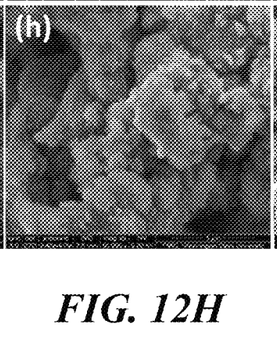
Figure 12I:
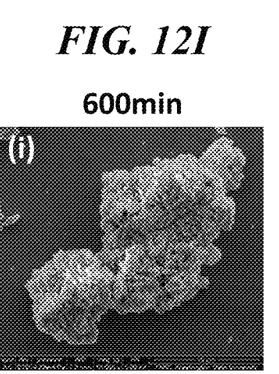
Figure 12J:
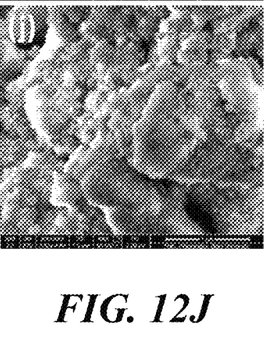

FIGS. 11A and 11B show example ex-situ XRD analysis to investigate the influence of temperature (600~800° C.) and holding time (50~600 minutes) on complete conversion of $Mg_2Si$, respectively. As shown in FIGS. 11A and 11B, temperatures from about 650° C. to about 800° C. and holding times of about 100 minutes to about 600 minutes may be sufficient to convert $Mg_2Si$ into magnesium oxide, silicon, and carbon by reacting with carbon dioxide.

FIGS. 12A-12J show example SEM images of MgO+Si+C composite at 700° C. for various holding times of 50 min, 100 min, 200 min, 400 min, and 600 min. These figures show that overall particle size does not change much but the morphology is significantly altered by the holding time from 50 min to 400 min. As shown in FIGS. 12A-12J, overall particle size did not appear to change much but morphology is significantly altered by a holding time from 50 min to 400 min. This morphology change is believed to be closely related to kinetics of the oxidation reaction, such as diffusion of $CO_2$ into bulk $Mg_2Si$ and reaction rate of $Mg_2Si+CO_2 \rightarrow 2MgO+Si+C$.

Figure 13:
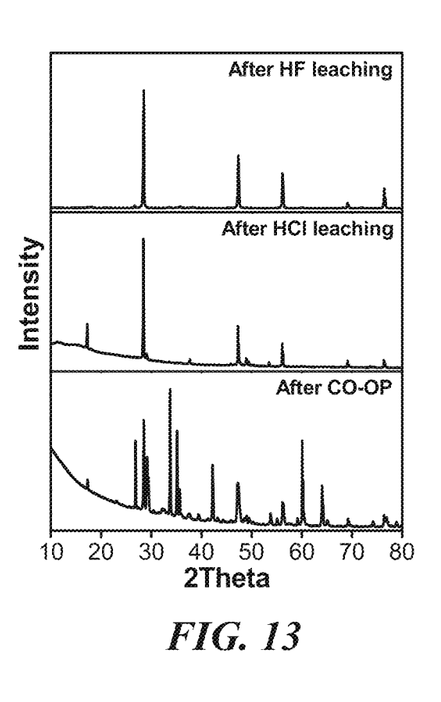
FIG. 13 shows example XRD patterns for CaO+Si+C composite after $CO_2$-thermic oxidation process with $CaSi_2$ (bottom) and Si+C after CaO removal (middle and top) in accordance with embodiments of the disclosed technology.

FIG. 13 shows example XRD patterns for CaO+Si+C composite after $CO_2$-thermic oxidation process with $CaSi_2$ (bottom) and Si+C after CaO removal (middle and top) in accordance with embodiments of the disclosed technology. As shown in FIG. 13, decrease in impurity phase ($FeSi_2$) can be clearly seen after HF leaching.

EXPERIMENTS

Certain experiments of the $CO_2$-thermic oxidation process using intermetallic compounds ($Mg_2Si$ and $CaSi_2$) as model systems were performed, including a thermodynamics feasibility study, an in-situ phase evolution analysis, and intensive microstructural characterization of the $CO_2$-thermic oxidation reaction.

The $CO_2$-thermic oxidation process was found to be an effective way to fabricate suitable anode materials for advanced energy storage systems, such as lithium batteries. The reaction product showed excellent long-term cycling stability and moderate rate capability. These results showed that the proposed $CO_2$-thermic oxidation process with oxidative intermetallic compounds is a pathway for recycling and utilizing $CO_2$ gas as for the formation of functional energy materials.

Synthesis of Magnesium Silicide

Commercially available silicon metal powder was purchased. After manually mixing 1 gram of silicon powder and 2 grams of magnesium powder, the mixture was put into stainless steel autoclave reactor and then tightly sealed in inert environment. Excess magnesium than the stoichiometric ratio of $Mg_2Si$ was used to ensure full conversion of silicon to silicide. To reduce exposure to air, at least three times of inert gas purging was performed prior to sealing the reactor. After the sealing, the reactor was place in a tube furnace with heating condition set to 500° C. for 10 hours at 1° C./min thermal ramping rate, and then naturally cooled to room temperature.

$CP_2$-Thermic Oxidation Process of $Mg_2Si$ 2 grams of prepared magnesium silicide was grinded and spread in an alumina crucible. The crucible was then place in the tube furnace set to 700° C. for 10 hours at 1° C./min thermal ramping rate in carbon dioxide gas flow. After the heat treatment, the resultant powder was immersed in 1 mol/L hydrochloric acid for at least 2 hours to remove magnesium oxide and followed by vacuum filtering and drying at 60° C. overnight.

Materials Characterization

X-ray diffractometers, or XRD were used to investigate the crystalline structure and material composition. Powder morphology was characterized using field emission scanning electron microscope (FEI Quanta 200F) and transmission electron microscope (FEI Technai G2 20 Twin with 200 kV LaB6 electron source). Also, energy dispersive spectroscopy (Tescan Vega3) was used to perform elemental analysis. Raman spectroscopy (Horiba LabRAM HR system equipped with 532 nm laser) was used to investigate the structure of the carbon after in-situ synthesized silicon/carbon composite. In-situ XRD data were collected using Rigaku Smartlab equipped with Anton Paar XRK900S high temperature chamber. The XRD data were continuously recorded during heating and cooling. Each scan took approximately 30 minutes and the scan range ($2\theta$) was from 20° to 50° where all the main peaks of silicon, magnesium silicide, magnesium oxide, and carbon can be detected.

Electrochemical Properties Measurements

To evaluate the electrochemical properties of the silicon/carbon composite, 2032 coin cells, having as-synthesized carbon-coated macro-porous silicon as working electrode and lithium metal chip (MTI) as counter electrode. The electrodes were prepared by slurry casting in which the slurry, composed of the carbon-coated macro-porous silicon material (60 wt %), Super P45 carbon black conducting agent (20 wt %), and poly(acrylic acid) (PAA, average molecular weight of 100 g/mol, Sigma Aldrich)/sodium carboxymethyl cellulose (CMC, 5 wt % in high purity water, Sigma Aldrich) binder (20 wt %, PAA:CMC=1:1 by weight) in purified distilled water, was evenly spread onto copper foil (current collector) and vacuum dried.

The electrolyte used was 1.3 mol/L lithium hexafluorophosphate ($LiPF_6$) in ethylene carbonate (EC)/Diethylene carbonate (DEC) (3:7 by volume) with 10 wt % fluoroethylene carbonate (FEC) additive. Current condition for the battery cycling test was as follows; for the first activation cycle, 0.05 C-rate (very slow current) was applied to measure apparent capacity of each coin cell assembled. Based on the capacity from the first cycle (1 C-rate), subsequent cycling test was performed at 0.2 C-rate between voltage range of 0.01 V and 1.2 V. Based on the apparent capacity of each coin cell, current conditions for subsequent cycling test were recalculated (or adjusted) accordingly. The subsequent cycling test was performed at 0.2 C-rate between voltage range of 0.01 V and 1.2 V.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

The invention claimed is:

1. A battery, comprising:
   a first electrode;
   an electrolyte in electrical communication with the first electrode, the electrolyte containing a plurality of metal ions; and
   a second electrode spaced apart from the first electrode and in electrical communication with the first electrode via the electrolyte, wherein the second electrode contains particles of a silicon material individually having:
   crystalline silicon in a matrix; and
   macro-scale pores distributed in the matrix of the crystalline silicon, the macro-scale pores having a size greater than 100 nanometers, wherein surfaces of crystalline silicon in the macro-scale pores are coated with carbon, wherein the particles of the silicon material are formed by performing a $CO_2$-thermic oxidation process on a metal silicide with a gas consisting of carbon dioxide to form a composite of one or more metal oxides, silicon, and carbon, wherein the particles of a silicon material are formed by:
   reacting a metal or a mixture of multiple metals with silicon (Si) in a solid-state reaction to form the metal silicide; and
   contacting the formed composite of one or more metal oxides, silicon, and carbon with an acid to remove the one or more metal oxides from the composite to produce particles of the silicon material individually having: the silicon formed in the $CO_2$-thermic oxidation process; and macro-scale pores in the silicon, the macro-scale pores corresponding to the removed metal oxide by the acid and having surfaces coated with the carbon from the performed $CO_2$-thermic oxidation process.

2. The battery of claim 1, wherein the surfaces of crystalline silicon in the macro-scale pores are coated with carbon generally uniformly.

3. The battery of claim 1, wherein: the macro-scale pore are randomly distributed in the matrix of the crystalline silicon; and the surfaces of crystalline silicon in the macro-scale pores are coated with carbon generally uniformly.

4. The battery of claim 1, wherein:
   the macro-scale pore are randomly distributed in the matrix of the crystalline silicon; and
   the surfaces of crystalline silicon in the macro-scale pores are coated with carbon generally uniformly, the carbon being in an amorphous form, a semi-crystalline or crystalline form, or a mixture thereof.

5. The battery of claim 1, wherein:
   the first electrode is constructed from one of lithium cobalt oxide ($LiCoO_2$), lithium iron phosphate ($LiFePO_4$), lithium manganese oxide ($LiMn_2O_4$), lithium nickel oxide ($LiNiO_2$), lithium iron phosphate fluoride ($Li_2FePO_4F$), $LiNiCoAlO_2$ having 80% Nickel, 15% Cobalt, and 5% Aluminum, $LiCoO_2$ having 100% Cobalt, $LiMn_2O_4$ having 100% Manganese, $LiNiMnCoO_2$ having 33.3% Nickel, 33.3% Manganese, and 33.3% Cobalt, LiFePO$_4$ having 100% Iron, or lithium cobalt nickel manganese oxide (LiCo$_{1/3}$Ni$_{1/3}$Mn$_{1/3}$O$_2$); and the electrolyte contains LiPF$_6$, LiAsF$_6$, LiClO$_4$, LiBF$_4$, or lithium triflate.

6. The battery of claim 1, wherein the second electrode retains at least 87% capacity after 400 charge cycles.

7. A silicon material, comprising:

crystalline silicon in a matrix; and macro-scale pores distributed in the matrix of the crystalline silicon, the macro-scale pores having a size greater than 100 nanometers, wherein surfaces of crystalline silicon in the macro-scale pores are coated with carbon, wherein the silicon material is formed by a process comprising performing a CO$_2$-thermic oxidation process on a metal silicide with a gas consisting of carbon dioxide to form a composite of one or more metal oxides, silicon, and carbon, wherein the silicon material is formed by a process comprising:

reacting a metal or a mixture of multiple metals with silicon (Si) in a solid-state reaction to form the metal silicide; and contacting the formed composite of one or more metal oxides, silicon, and carbon with an acid to remove the one or more metal oxides from the composite to produce particles of the silicon material individually having: the silicon formed in the CO$_2$-thermic oxidation process; and macro-scale pores in the silicon, the macro-scale pores corresponding to the removed metal oxide by the acid and having surfaces coated with the carbon from the performed CO$_2$-thermic oxidation process.

8. The silicon material of claim 7, wherein the surfaces of crystalline silicon in the macro-scale pores are coated with carbon generally uniformly.

9. The silicon material of claim 7, wherein:

the macro-scale pores are randomly distributed in the matrix of the crystalline silicon; and the surfaces of crystalline silicon in the macro-scale pores are coated with carbon generally uniformly.

10. The silicon material of claim 7, wherein:

the macro-scale pores are randomly distributed in the matrix of the crystalline silicon; and the surfaces of crystalline silicon in the macro-scale pores are coated with carbon generally uniformly, the carbon being in an amorphous form, a semi-crystalline or crystalline form, or a mixture thereof.

11. The silicon material of claim 7, wherein:

the macro-scale pores are randomly distributed in the matrix of the crystalline silicon;

the surfaces of crystalline silicon in the macro-scale pores are coated with carbon generally uniformly, the carbon being in an amorphous form, a semi-crystalline or crystalline form, or a mixture thereof; and the matrix of the crystalline silicon has a layered two-dimensional silicon morphology.

12. The silicon material of claim 7, wherein the second electrode retains at least 87% capacity after 400 charge cycles.

* * * * *